(12) United States Patent
Okazaki

(10) Patent No.: US 10,707,700 B2
(45) Date of Patent: Jul. 7, 2020

(54) POWER FEEDING SYSTEM, POWER FEEDING DEVICE, AND POWER FEEDING METHOD

(71) Applicant: ABLIC Inc., Chiba-shi, Chiba (JP)

(72) Inventor: Norihiro Okazaki, Chiba (JP)

(73) Assignee: ABLIC INC., Chiba (JP)

( * ) Notice: Subject to any disclaimer, the term of this patent is extended or adjusted under 35 U.S.C. 154(b) by 173 days.

(21) Appl. No.: 15/874,328

(22) Filed: Jan. 18, 2018

(65) Prior Publication Data

US 2018/0212472 A1 Jul. 26, 2018

(30) Foreign Application Priority Data

Jan. 24, 2017 (JP) .................................. 2017-010293

(51) Int. Cl.
| | |
|---|---|
| H02J 50/12 | (2016.01) |
| H02M 3/335 | (2006.01) |
| H02J 7/02 | (2016.01) |
| H02M 1/00 | (2006.01) |

(52) U.S. Cl.
CPC ............ H02J 50/12 (2016.02); H02M 3/335 (2013.01); H02M 3/33507 (2013.01); *H02J 7/025* (2013.01); *H02M 2001/0058* (2013.01)

(58) Field of Classification Search
CPC .. H02J 5/005; H02J 50/12; H02J 50/60; H02J 7/025
See application file for complete search history.

(56) References Cited

U.S. PATENT DOCUMENTS

| | | | | |
|---|---|---|---|---|
| 2011/0053500 A1* | 3/2011 | Menegoli | ............... | H02J 5/005 455/41.1 |
| 2015/0091387 A1* | 4/2015 | Okazaki | .................. | H02J 5/005 307/104 |

FOREIGN PATENT DOCUMENTS

| | | |
|---|---|---|
| JP | 2000-060010 A | 2/2000 |
| JP | 2009-240099 A | 10/2009 |
| JP | 2015-070689 A | 4/2015 |

* cited by examiner

*Primary Examiner* — Rexford N Barnie
*Assistant Examiner* — Elim Ortiz
(74) *Attorney, Agent, or Firm* — Brinks Gilson & Lione

(57) ABSTRACT

A power feeding system has a power receiving device having: a resonant circuit having a receiving coil, a resonant capacitor configured to resonate with the receiving coil, and a first switching element configured to change an electrical connection state of the resonant capacitor; and a resonance control unit configured to control the first switching element, and has a power feeding device having: a second switching element connected in series to a feeding coil; a drive signal generation unit configured to generate a drive signal for driving the feeding coil; a variation detection unit configured to detect the change in electrical connection state of the resonant capacitor; and a power feeding control unit configured to control electric power supplied to the feeding coil based on a period of the resonant state and a period of the non-resonant state that are estimated from the periodic waveform variation.

9 Claims, 8 Drawing Sheets

POWER FEEDING SYSTEM, POWER FEEDING DEVICE, AND POWER FEEDING METHOD

RELATED APPLICATIONS

This application claims priority under 35 U.S.C. § 119 to Japanese Patent Application No. 2017-010293 filed on Jan. 24, 2017, the entire content of which is hereby incorporated by reference.

BACKGROUND OF THE INVENTION

1. Field of the Invention

The present invention relates to a power feeding system, a power feeding device, and a power feeding method.

2. Description of the Related Art

In recent years, there has been known a power feeding system configured to supply electric power wirelessly through electromagnetic induction or electromagnetic coupling between a feeding coil and a receiving coil (see, for example, Japanese Patent Application Laid-open No. 2015-70689). There has also been known a technology for a power feeding device in the above-mentioned power feeding system to control the power supplied from the feeding coil depending on the state of a load on a power receiving side (see, for example, Japanese Patent Application Laid-open Nos. 2000-60010 and 2009-240099).

However, for example, in the technology described in Japanese Patent Application Laid-open Nos. 2000-60010 and 2009-240099 described above, it is necessary to install a communication unit configured to transmit data from a power receiving device to the power feeding device in order for the power feeding device to grasp the state of the load on the power receiving side.

SUMMARY OF THE INVENTION

An object of the present invention is to provide a power feeding system, a power feeding device, and a power feeding method, which are capable of improving power feeding efficiency without addition of a communication unit configured to transmit data from a power receiving device to the power feeding device.

According to one embodiment of the present invention, there is provided a power feeding system, comprising: a power feeding device having a feeding coil; and a power receiving device having a receiving coil, the power feeding system being configured to supply electric power from the power feeding device to the power receiving device through electromagnetic induction, the power receiving device comprising: a resonant circuit having: the receiving coil configured to receive the electric power from the feeding coil; a resonant capacitor configured to resonate with the receiving coil; and a first switching element configured to perform switching between a resonant state and a non-resonant state by changing an electrical connection state of the resonant capacitor; and a resonance control unit configured to control the first switching element based on received power by the receiving coil from the feeding coil, and power consumption of a load to which the received power is supplied, the power feeding device comprising: a second switching element connected in series to the feeding coil; a drive signal generation unit configured to generate a drive signal for driving the feeding coil by switching the second switching element between a conductive state and a non-conductive state; a variation detection unit configured to detect the change in electrical connection state of the resonant capacitor as a periodic waveform variation in an excited voltage excited in the feeding coil; and a power feeding control unit configured to control electric power supplied to the feeding coil based on a period of the resonant state and a period of the non-resonant state that are estimated from the periodic waveform variation detected by the variation detection unit.

Further, according to one embodiment of the present invention, there is provided a power feeding device configured to supply electric power, through electromagnetic induction, to a power receiving device having a receiving coil, a resonant capacitor configured to resonate with the receiving coil, and a first switching element configured to perform switching between a resonant state and a non-resonant state of the resonant capacitor, the power feeding device comprising: a feeding coil; a second switching element connected in series to the feeding coil; a drive signal generation unit configured to generate a drive signal for driving the feeding coil by switching the second switching element between a conductive state and a non-conductive state; a variation detection unit configured to detect the change in electrical connection state of the resonant capacitor as a periodic waveform variation in an excited voltage excited in the feeding coil; and a power feeding control unit configured to control electric power supplied to the feeding coil based on a period of the resonant state and a period of the non-resonant state that are estimated from the periodic waveform variation detected by the variation detection unit.

Further, according to one embodiment of the present invention, there is provided a power feeding method for a power feeding system configured to supply the electric power from a power feeding device to a power receiving device through electromagnetic induction, the power receiving device comprising a resonant circuit having a receiving coil configured to receive electric power, a resonant capacitor configured to resonate with the receiving coil, and a first switching element configured to perform switching between a resonant state and a non-resonant state by changing an electrical connection state of the resonant capacitor, the power feeding device comprising a feeding coil, and a second switching element connected in series to the feeding coil, the power feeding method comprising:

generating a drive signal by the power feeding device for driving the feeding coil by switching the second switching element between a conductive state and a non-conductive state;

controlling the first switching element by the power receiving device based on received power by the receiving coil from the feeding coil, and power consumption of a load to which the received power is supplied;

detecting the change in electrical connection state of the resonant capacitor by the power feeding device as a periodic waveform variation in an excited voltage excited in the feeding coil; and controlling electric power supplied to the feeding coil by the power feeding device based on a period of the resonant state and a period of the non-resonant state estimated from the periodic waveform variation.

According to the present invention, the power feeding efficiency can be improved without addition of a communication unit.

DETAILED DESCRIPTION OF THE EMBODIMENTS

Now, a power feeding system according to one embodiment of the present invention is described with reference to the drawings.

First Embodiment

Figure 1:
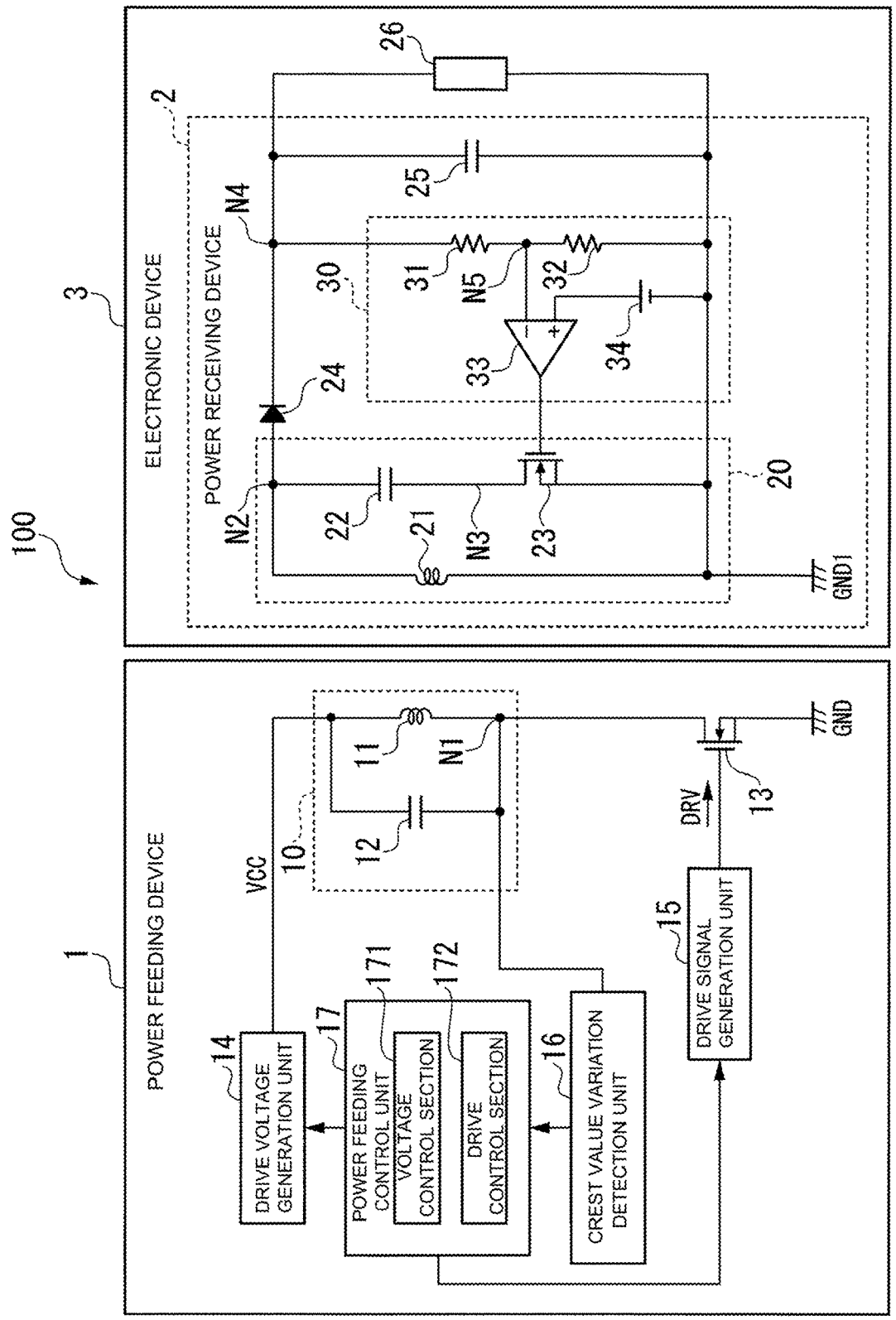
FIG. 1 is a functional block diagram for illustrating an example of a power feeding system according to a first embodiment of the present invention.

FIG. 1 is a functional block diagram for illustrating an example of a power feeding system 100 according to a first embodiment of the present invention.

As illustrated in FIG. 1, the power feeding system 100 includes a power feeding device 1 and an electronic device 3 having a power receiving device 2.

The power feeding system 100 is a system configured to supply electric power from the power feeding device 1 to the power receiving device 2 wirelessly (in a non-contact manner). For example, the power feeding system 100 is configured to supply electric power for operating a load 26 included in the power receiving device 2 from the power feeding device 1 to the power receiving device 2.

The electronic device 3 is, for example, a mobile phone terminal or a personal digital assistant (PDA), and includes the power receiving device 2 and the load 26. Further, the power feeding device 1 is, for example, a charger compatible with the power receiving device 2.

<Configuration of Power Feeding Device 1>

The power feeding device 1 includes a feeding coil 11, a resonant capacitor 12, a drive transistor 13, a drive voltage generation unit 14, a drive signal generation unit 15, a crest value variation detection unit 16, and a power feeding control unit 17.

The feeding coil 11 has a first terminal connected to a terminal at a VCC voltage supplied from the drive voltage generation unit 14, and a second terminal connected to a node N1. The feeding coil 11 is a coil configured to supply electric power to a receiving coil 21 included in the power receiving device 2 through, for example, electromagnetic induction or electromagnetic coupling. For supplying electric power to the power receiving device 2, the feeding coil 11 is arranged to be opposed to the receiving coil 21 to supply electric power to the receiving coil 21 through electromagnetic induction.

The resonant capacitor 12 is a capacitor that is connected in parallel to the feeding coil 11, and is configured to resonate with the feeding coil 11. The feeding coil 11 and the resonant capacitor 12 form a resonant circuit 10. The resonant circuit 10 is configured to resonate at a predetermined resonant frequency (for example, 100 kHz (kilohertz)) determined by an inductance value of the feeding coil 11 and a capacitance value of the resonant capacitor 12.

The drive transistor 13 (an example of a second switching element) is, for example, a field effect transistor (FET), and is connected in series to the resonant circuit 10. In the first embodiment, the case in which the drive transistor 13 is an N-channel metal oxide semiconductor (MOS) FET is described as an example. In the following, "MOSFET" is sometimes referred to as a MOS transistor, and "N-channel MOS transistor" is sometimes referred to as an NMOS transistor.

Specifically, the drive transistor 13 has a source terminal connected to a GND terminal, a gate terminal connected to an output signal line of the drive signal generation unit 15, and a drain terminal connected to the node N1. The drive transistor 13 periodically repeats an ON state (conductive state) and an OFF state (non-conductive state) with a drive signal DRV generated by the drive signal generation unit 15. In other words, the supply and release of electric power to and from the resonant circuit 10 are repeated by the switching operation of the drive transistor 13. In this manner, a periodic signal is generated in the feeding coil 11, and electric power is supplied from the feeding coil 11 to the receiving coil 21 through electromagnetic induction.

The drive voltage generation unit 14 is configured to generate the VCC voltage for driving the feeding coil 11. The drive voltage generation unit 14 is a variable power supply capable of changing the VCC voltage based on the control by the power feeding control unit 17. That is, the drive voltage generation unit 14 is configured to change the VCC voltage supplied to the feeding coil 11 based on a control signal output from the power feeding control unit 17.

The drive signal generation unit 15 is configured to generate the drive signal DRV for driving the feeding coil 11, by switching the drive transistor 13 between the conductive state and the non-conductive state. As used herein, the drive signal DRV is a signal for periodically switching the drive transistor 13 between the ON state (conductive state) and the OFF state (non-conductive state). In other words, the drive signal generation unit 15 is configured to generate the drive signal DRV for periodically controlling the ON state/OFF state of the drive transistor 13. Further, the drive signal generation unit 15 is configured to output the drive signal DRV or stop outputting the drive signal DRV based on the control signal output from the power feeding control unit 17.

The crest value variation detection unit 16 (an example of a variation detection unit) is configured to detect a change in resonant state of a resonant circuit 20 of the power receiving device 2. The change occurs in relation to a connection state of a resonant capacitor 22 of the power receiving device 2 which is described later, as a periodic waveform variation in an excited voltage excited in the feeding coil 11. The periodic waveform variation includes a variation in peak voltage of the excited voltage. In the first embodiment, the crest value variation detection unit 16 is configured to detect the change in resonant state of the resonant circuit 20 of the power receiving device 2 as the variation in peak voltage of the excited voltage excited in the feeding coil 11. The crest value variation detection unit 16 is configured to output detection results of the variation in peak voltage to the power feeding control unit 17.

The crest value variation detection unit 16 is configured to hold the peak voltage excited in the feeding coil 11, for example, through use of a sample-and-hold circuit, to thereby detect the variation in peak voltage.

The power feeding control unit 17 is configured to control whether the drive transistor 13 is intermittently driven or continuously driven with the drive signal DRV generated by the drive signal generation unit 15, based on the results of the variation in peak voltage detected by the crest value variation detection unit 16, and change the VCC voltage generated by the drive voltage generation unit 14, based on a period of a resonant state and a period of a non-resonant state that are estimated from the results of the variation in peak voltage. The power feeding control unit 17 includes a voltage control section 171 and a drive control section 172.

The voltage control section 171 is configured to control electric power supplied to the feeding coil 11, based on the period of the resonant state and the period of the non-resonant state of the power receiving device 2 that are estimated from the periodic waveform variation detected by the crest value variation detection unit 16. The power feeding control unit 17 is configured to change a voltage supplied to the feeding coil 11, for example, so that a ratio between the period of the resonant state and the period of the non-resonant state reaches a predetermined ratio. The voltage control section 171 is configured to estimate the period of the resonant state and the period of the non-resonant state of the power receiving device 2, for example, based on the results of the variation in peak voltage detected by the crest value variation detection unit 16, and calculate the ratio between the period of the resonant state and the period of the non-resonant state. The voltage control section 171 is configured to calculate a resonance ratio as an example of the ratio between the period of the resonant state and the period of the non-resonant state by the following expression (1), for example.

$$\text{Resonance ratio} = \text{Period of resonant state/period of non-resonant state} \quad (1)$$

The voltage control section 171 is configured to control the drive voltage (VCC voltage) output from the drive voltage generation unit 14 so that the calculated resonance ratio reaches the predetermined value (predetermined ratio).

Specifically, the voltage control section 171 is configured to perform control of raising (increasing) the drive voltage output from the drive voltage generation unit 14 when the calculated resonance ratio is larger than the predetermined value. Meanwhile, the voltage control section 171 is configured to perform control of lowering (decreasing) the drive voltage output from the drive voltage generation unit 14 when the calculated resonance ratio is smaller than the predetermined value.

In this case, the predetermined value (predetermined ratio) is determined to be a ratio at which power feeding efficiency is satisfactory, based on power consumption of the load 26 and supply power from the power feeding device 1 to the power receiving device 2. The power feeding efficiency is influenced by the power consumption of the load 26, the ratio between the period of the resonant state and the period of the non-resonant state, and the like. The power feeding efficiency is improved as the resonant state is prolonged. The predetermined value (predetermined ratio) is therefore set so that the ratio (resonance ratio) between the period of the resonant state and the period of the non-resonant state becomes equal to or more than the predetermined value (predetermined ratio).

The drive control section 172 is configured to determine whether or not electric power can be supplied to the power receiving device 2 based on the periodic waveform variation detected by the crest value variation detection unit 16, and control whether or not to continue the supply of the drive signal to the drive transistor 13 based on a result of the determination. Specifically, the drive control section 172 is configured to determine based on the variation in peak voltage detected by the crest value variation detection unit 16 whether or not electric power can be supplied to the power receiving device 2, and control whether or not to continue the supply of the drive signal DRV to the drive transistor 13 based on a result of the determination.

For example, when it is determined that electric power can be supplied to the power receiving device 2, the drive control section 172 causes the drive signal generation unit 15 to continue the supply of the drive signal DRV, thereby performing continuous drive for continuously driving the feeding coil 11. Meanwhile, for example, when it is determined that electric power cannot be supplied to the power receiving device 2, the drive control section 172 causes the drive signal generation unit 15 to stop the supply of the drive signal DRV, thereby performing intermittent drive for intermittently (non-continuously) driving the feeding coil 11. The state in which electric power cannot be supplied to the power receiving device 2 (power supply impossible state) refers to, for example, the case in which there is no power receiving device 2 (including the case in which the feeding coil 11 and the receiving coil 21 are not located at appropriate positions) and the case in which a metallic foreign object is placed on the feeding coil 11.

Specifically, for example, the drive control section 172 causes the drive signal generation unit 15 to supply the drive signal DRV to the drive transistor 13 in a predefined detection period (first period), and causes the crest value variation detection unit 16 to detect the variation in peak voltage. Then, when it is determined in this detection period that electric power can be supplied to the power receiving device 2, the drive control section 172 causes the drive signal generation unit 15 to continue the supply of the drive signal DRV to the drive transistor 13 for a predefined power supply period (second period) after the detection period, to thereby continuously drive the feeding coil 11. When it is determined in this detection period that electric power cannot be supplied to the power receiving device 2, the drive control section 172 causes the drive signal generation unit 15 to stop the supply of the drive signal DRV to the drive transistor 13 in the power supply period after the detection period, to thereby intermittently drive the feeding coil 11.

<Configuration of Power Receiving Device 2>

The power receiving device 2 includes the receiving coil 21, the resonant capacitor 22, a resonance control transistor 23, a rectifying diode 24, a smoothing capacitor 25, and a resonance control unit 30. Further, the power receiving device 2 is configured to supply electric power received from the power feeding device 1 to the load 26.

The receiving coil 21 has a first terminal connected to a node N2, and a second terminal connected to a GND1 terminal. The receiving coil 21 is a coil supplied with electric power from the feeding coil 11 included in the power feeding device 1 through, for example, electromagnetic induction or electromagnetic coupling. For supplying electric power to the load 26, the receiving coil 21 is arranged to be opposed to the feeding coil 11.

The resonant capacitor 22 is a capacitor that is connected in parallel to the receiving coil 21, and is configured to resonate with the receiving coil 21. The resonant capacitor 22 is connected between the node N2 and a node N3.

The receiving coil 21, the resonant capacitor 22, and the resonance control transistor 23 form the resonant circuit 20. The resonant circuit 20 is configured to resonate at a predetermined resonant frequency (for example, 100 kHz) determined by an inductance value of the receiving coil 21 and a capacitance value of the resonant capacitor 22. In the first embodiment, the resonant frequency of the power receiving device 2 and the resonant frequency of the power feeding device 1 are equal to each other, for example, 100 kHz.

The resonance control transistor 23 (an example of a first switching element) is a switching element configured to switch the resonant circuit 20 between the resonant state and the non-resonant state by changing an electrical connection state of the resonant capacitor 22. The resonance control transistor 23 is connected in parallel to the receiving coil 21 together with the resonant capacitor 22, and is connected in series to the resonant capacitor 22. The resonance control transistor 23 is, for example, an NMOS transistor, and has a source terminal connected to the GND1 terminal, and a drain terminal connected to the node N3. The resonance control transistor 23 has a gate terminal connected to an output signal line of the resonance control unit 30 to be described later. When the resonance control transistor 23 is set to the ON state by the resonance control unit 30, the resonant capacitor 22 functions to resonate the resonant circuit 20. When the resonance control transistor 23 is set to the OFF state by the resonance control unit 30, the resonant capacitor 22 is electrically disconnected to stop the resonance of the resonant circuit 20.

The rectifying diode 24 (rectifier unit) has an anode terminal connected to the node N2 corresponding to one terminal of the receiving coil 21, and a cathode terminal connected to a node N4 corresponding to one terminal of the smoothing capacitor 25. The rectifying diode 24 is configured to rectify electric power received by the receiving coil 21, and convert the received electric power into DC electric power. Specifically, the rectifying diode 24 is configured to convert AC electric power (AC voltage) generated in the receiving coil 21 into DC electric power (DC voltage), to thereby supply electric power to the load 26.

The smoothing capacitor 25 is configured to smooth the DC electric power obtained through the conversion by the rectifying diode 24.

The load 26 is, for example, various circuits, a drive unit, or a circuit configured to charge a storage battery or a secondary battery included in the electronic device 3, and is operated or charged with a DC voltage rectified by the rectifying diode 24. The load 26 may be, for example, a system using a microcomputer, a power supply circuit of the system, an audio amplifier, a radio circuit, a sensor circuit, an illumination drive circuit, or a display circuit.

The resonance control unit 30 is configured to control the resonant state of the resonant circuit 20 by controlling the resonance control transistor 23. The resonance control unit 30 is configured to control the resonance control transistor 23 based on the received power, which is received by the receiving coil 21 from the feeding coil 11, and power consumption of the load 26 to which the received power is supplied. The resonance control unit 30 is configured to control the resonance control transistor 23, for example, based on a voltage of a supply line (voltage of the node N4) through which the received power after rectification is supplied to the load 26. The voltage of the supply line (voltage of the node N4) varies depending on the received power and the power consumption of the load 26. The control of the resonance control transistor 23 based on the voltage of the supply line (voltage of the node N4) is hence an example of the control of the resonance control transistor 23 based on the received power and the power consumption of the load 26.

The resonance control unit 30 is configured to control the resonance control transistor 23 so that the resonant circuit 20 is set to the resonant state, for example, when the voltage of the supply line (voltage of the node N4) is equal to or less than a predetermined threshold value. Meanwhile, the resonance control unit 30 is configured to control the resonance control transistor 23 so that the resonant circuit 20 is set to the non-resonant state, for example, when the voltage of the supply line (voltage of the node N4) is larger than the predetermined threshold value.

Further, the resonance control unit 30 includes a resistor 31, a resistor 32, a comparator 33, and a reference power supply 34.

The resistor 31 has the first terminal connected to the node N4, and the second terminal connected to a node N5. Further, the resistor 32 has the first terminal connected to the node N5, and the second terminal connected to the GND1 terminal. The resistor 31 and the resistor 32 are connected in series between the node N4 and the GND1 terminal. Through the resistor 31 and the resistor 32, a voltage, which is obtained by decreasing the voltage of the node N4 by voltage division at a ratio between resistance values of the resistor 31 and the resistor 32, is output to the node N5.

The comparator 33 has a positive input terminal connected to the reference power supply 34, and a negative input terminal connected to the node N5. The comparator 33 is configured to compare the voltage of the node N5 and an output voltage of the reference power supply 34 to each other, and turn on the resonance control transistor 23 when the voltage of the node N5 is equal to or less than the output voltage of the reference power supply 34. The comparator 33 is configured to turn off the resonance control transistor 23 when the voltage of the node N5 is larger than the output voltage of the reference power supply 34. Further, the reference power supply 34 is a constant voltage source configured to output a predetermined threshold voltage.

Next, the operation of the power feeding system 100 according to the first embodiment is described with reference to the drawings.

Figure 2:
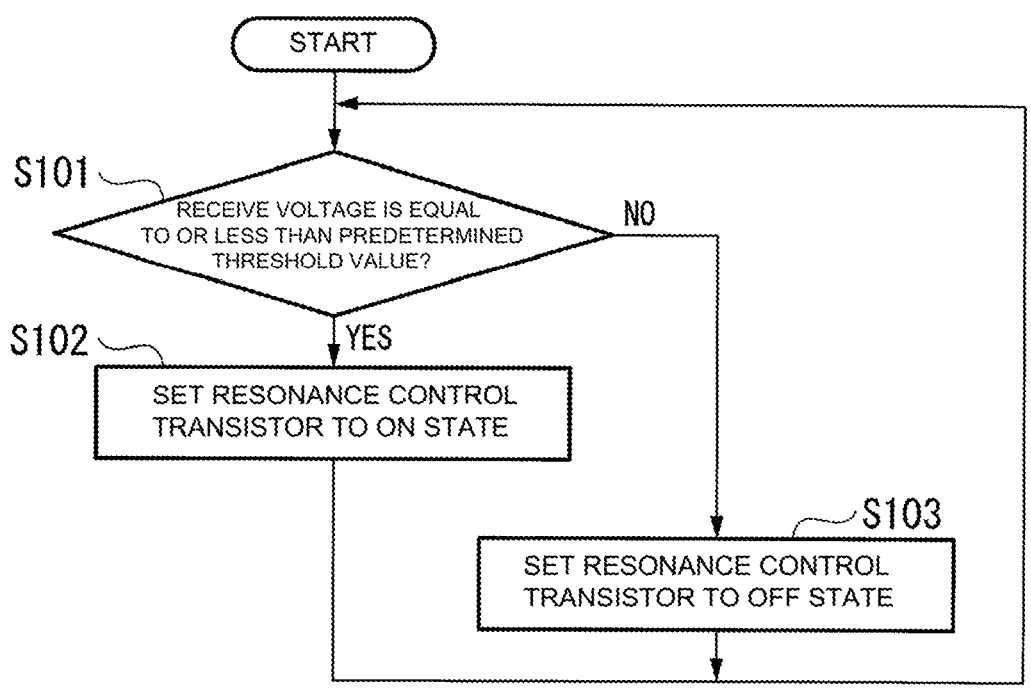
FIG. 2 is a flowchart for illustrating an example of resonance control processing of a power receiving device according to the first embodiment.

FIG. 2 is a flowchart for illustrating an example of resonance control processing of the power receiving device 2 according to the first embodiment.

In FIG. 2, when electric power is supplied wirelessly (in a non-contact manner) from the feeding coil 11 of the power feeding device 1 to the receiving coil 21 of the power receiving device 2, the power receiving device 2 determines whether or not the voltage (receiving voltage) of the node N4 is equal to or less than the predetermined threshold value (Step S101). Specifically, the resonance control unit 30 subjects the voltage (receiving voltage) of the node N4 to the voltage division of the resistor 31 and the resistor 32, and compares, by the comparator 33, the voltage obtained by the voltage division (voltage of the node N5) and the output voltage of the reference power supply 34 to each other. In this way, the resonance control unit 30 determines whether or not the voltage (receiving voltage) of the node N4 is equal to or less than the predetermined threshold value.

When the voltage (receiving voltage) of the node N4 is equal to or less than the predetermined threshold value (Step S101: YES), the resonance control unit 30 sets the resonance control transistor 23 to the ON state (Step S102). Specifically, the resonance control unit 30 outputs an H state to the gate terminal of the resonance control transistor 23. In this manner, the resonance control transistor 23 becomes the ON state to electrically connect the resonant capacitor 22 to the resonant circuit 20.

Meanwhile, when the voltage (receiving voltage) of the node N4 is more than the predetermined threshold value (Step S101: NO), the resonance control unit 30 sets the resonance control transistor 23 to the OFF state (Step S103). Specifically, the resonance control unit 30 outputs an L state to the gate terminal of the resonance control transistor 23. In this manner, the resonance control transistor 23 becomes the OFF state to electrically disconnect the resonant capacitor 22 from the resonant circuit 20.

After the processing in Step S102 or Step S103, the resonance control unit 30 returns the flow to Step S101, and the processing in Step S101 to Step S103 is repeated.

In this manner, the resonance control unit 30 is configured to perform control to switch the resonant state of the resonant circuit 20. Specifically, the resonance control unit 30 is configured to perform control to periodically switch the resonant circuit 20 between the resonant state and the non-resonant state.

A ratio between the period of the resonant state (resonant period) of the resonant circuit 20 and the period of the non-resonant state (non-resonant period) thereof varies depending on the received power, which is received by the power receiving device 2, and the power consumption of the load 26. The power feeding efficiency in the period of the resonant state of the resonant circuit 20 is higher than that in the period of the non-resonant state of the resonant circuit 20. The power feeding efficiency is therefore improved, for example, as the period of the resonant state of the resonant circuit 20 becomes longer (as the resonance ratio becomes higher). In the first embodiment, the power feeding device 1 is configured to control electric power supplied to the feeding coil 11 so that the period of the resonant state of the resonant circuit 20 reaches a predetermined proportion.

Figure 3:
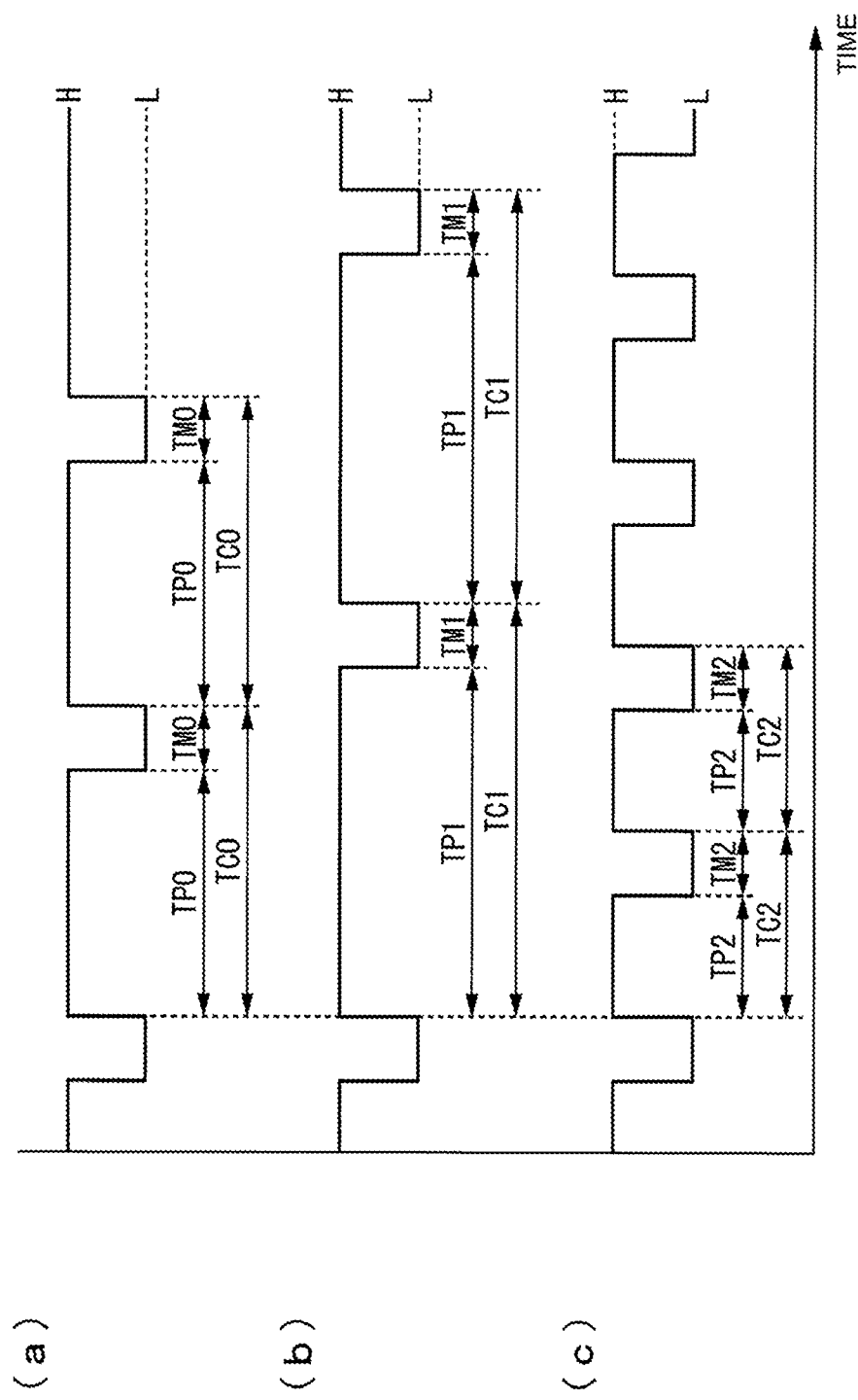
FIG. 3 is a diagram for illustrating an example of a change between a resonant period and a non-resonant period in the first embodiment.

FIG. 3 is a diagram for illustrating an example of a change between the resonant period and the non-resonant period in the first embodiment.

Waveforms illustrated in FIG. 3 represent, in the order from above, (a) a gate signal of the resonance control transistor 23 in the case of a target resonance ratio, (b) a gate signal of the resonance control transistor 23 when the resonance ratio is high, and (c) a gate signal of the resonance control transistor 23 when the resonance ratio is low. The vertical axes of the waveforms represent a logic level, and the horizontal axes thereof represent time.

In (a) of FIG. 3, a period TP0 corresponds to the resonant period, and a period TM0 corresponds to the non-resonant period. Further, a period TC0 represents a repetition cycle of the resonant period and the non-resonant period. In this case, a ratio between the period TP0 and the period TM0 is defined as a target value of the ratio (predetermined ratio) between the resonant period and the non-resonant period.

Further, the example illustrated in (b) of FIG. 3 represents the case in which the distance between the feeding coil 11 and the receiving coil 21 is large, the case in which the feeding coil 11 and the receiving coil 21 are misaligned with each other, or the case in which the received power is insufficient with respect to the power consumption of the load 26 because the power consumption of the load 26 is large, for example. In (b) of FIG. 3, a period TP1 corresponds to the resonant period, and a period TM1 corresponds to the non-resonant period. Further, a period TC1 represents a repetition cycle of the resonant period and the non-resonant period. In this case, the resonant period (period TP1) is longer and the resonance ratio is higher than those in the case of (a) of FIG. 3 described above. Further, the repetition cycle (period TC1) is also longer than that in the case of (a) of FIG. 3.

Further, the example illustrated in (c) of FIG. 3 represents the case in which the distance between the feeding coil 11 and the receiving coil 21 is small, the case in which the feeding coil 11 and the receiving coil 21 are aligned with each other, or the case in which the received power is excessive with respect to the power consumption of the load 26 because the power consumption of the load 26 is small, for example. In (c) of FIG. 3, a period TP2 corresponds to the resonant period, and a period TM2 corresponds to the non-resonant period. Further, a period TC2 represents a repetition cycle of the resonant period and the non-resonant period. In this case, the resonant period (period TP2) is shorter and the resonance ratio is lower than those in the case of (a) of FIG. 3 described above. Further, the repetition cycle (period TC2) is also shorter than that in the case of (a) of FIG. 3.

Next, voltage control processing of the power feeding device 1 according to the first embodiment is described with reference to FIG. 4 and FIG. 5.

Figure 4:
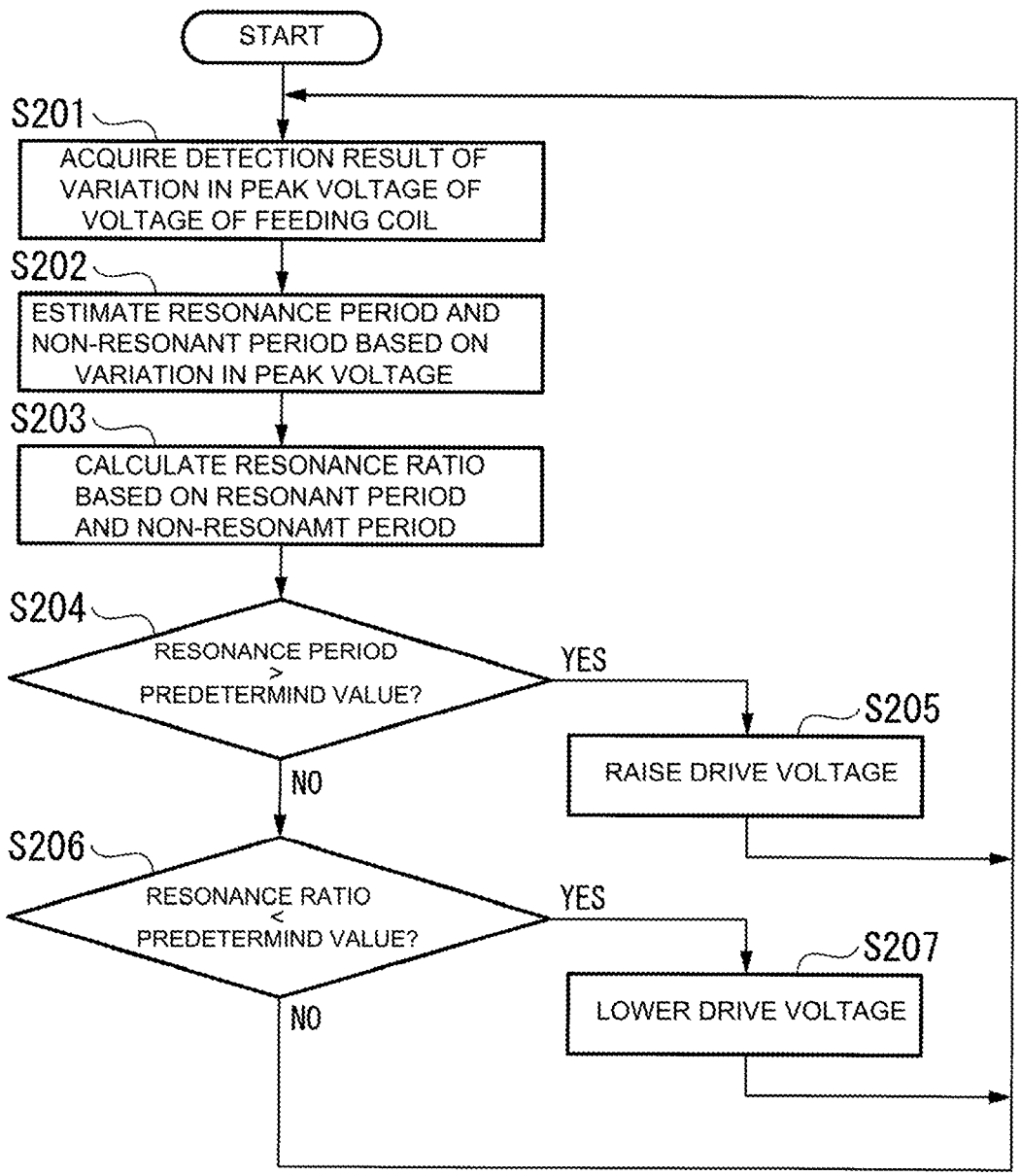
FIG. 4 is a flowchart for illustrating an example of voltage control processing of a power feeding device according to the first embodiment.

FIG. 4 is a flowchart for illustrating an example of the voltage control processing of the power feeding device 1 according to the first embodiment.

In FIG. 4, first, the power feeding control unit 17 of the power feeding device 1 acquires the detection results of the variation in peak voltage of the voltage of the feeding coil 11 (Step S201). That is, the crest value variation detection unit 16 detects the variation in peak voltage, and the voltage control section 171 of the power feeding control unit 17 acquires the detection results of the variation in peak voltage, which are detected by the crest value variation detection unit 16.

Next, the voltage control section 171 estimates the resonant period and the non-resonant period based on the variation in peak voltage (Step S202).

Next, the voltage control section 171 calculates a resonance ratio based on the resonant period and the non-resonant period (Step S203). The voltage control section 171 calculates the resonance ratio as a ratio between the resonant period and the non-resonant period through use of the above-mentioned expression (1), for example. The voltage control section 171 may calculate the resonance ratio based on a moving average over a plurality of cycles (for example, three cycles) of a ratio between the resonant period and the non-resonant period.

Next, the voltage control section 171 determines whether or not the calculated resonance ratio is larger than the predetermined value (predetermined ratio) (Step S204). The case in which the resonance ratio is larger than the predetermined value (predetermined ratio) corresponds to (b) of FIG. 3 described above, in which the received power is insufficient with respect to the power consumption of the load 26. When the resonance ratio is larger than the predetermined value (predetermined ratio) (Step S204: YES), the voltage control section 171 advances the flow to Step S205. Meanwhile, when the resonance ratio is not larger than the predetermined value (predetermined ratio) (Step S204: NO), the voltage control section 171 advances the flow to Step S206.

In Step S205, the voltage control section 171 performs control of raising the drive voltage. That is, the voltage control section 171 outputs a control signal for increasing the VCC voltage to the drive voltage generation unit 14. The voltage control section 171 may, for example, increase the VCC voltage by a certain voltage ΔV or change a voltage increase value based on a difference between the resonance ratio and the predetermined value (predetermined ratio). After the processing in Step S205, the voltage control section 171 returns the flow to Step S201.

Further, in Step S206, the voltage control section 171 determines whether or not the calculated resonance ratio is smaller than the predetermined value (predetermined ratio). The case in which the resonance ratio is smaller than the predetermined value (predetermined ratio) corresponds to (c) of FIG. 3 described above, in which the received power is excessive with respect to the power consumption of the load 26. When the resonance ratio is smaller than the predetermined value (predetermined ratio) (Step S206: YES), the voltage control section 171 advances the flow to Step S207. Meanwhile, when the resonance ratio is not smaller than the predetermined value (predetermined ratio) (Step S206: NO), the voltage control section 171 returns the flow to Step S201.

In Step S207, the voltage control section 171 performs control of lowering the drive voltage. That is, the voltage control section 171 outputs a control signal for decreasing the VCC voltage to the drive voltage generation unit 14. The voltage control section 171 may, for example, decrease the VCC voltage by the certain voltage ΔV or change a voltage decrease value based on a difference between the resonance ratio and the predetermined value (predetermined ratio). After the processing in Step S207, the voltage control section 171 returns the flow to Step S201.

Figure 5:
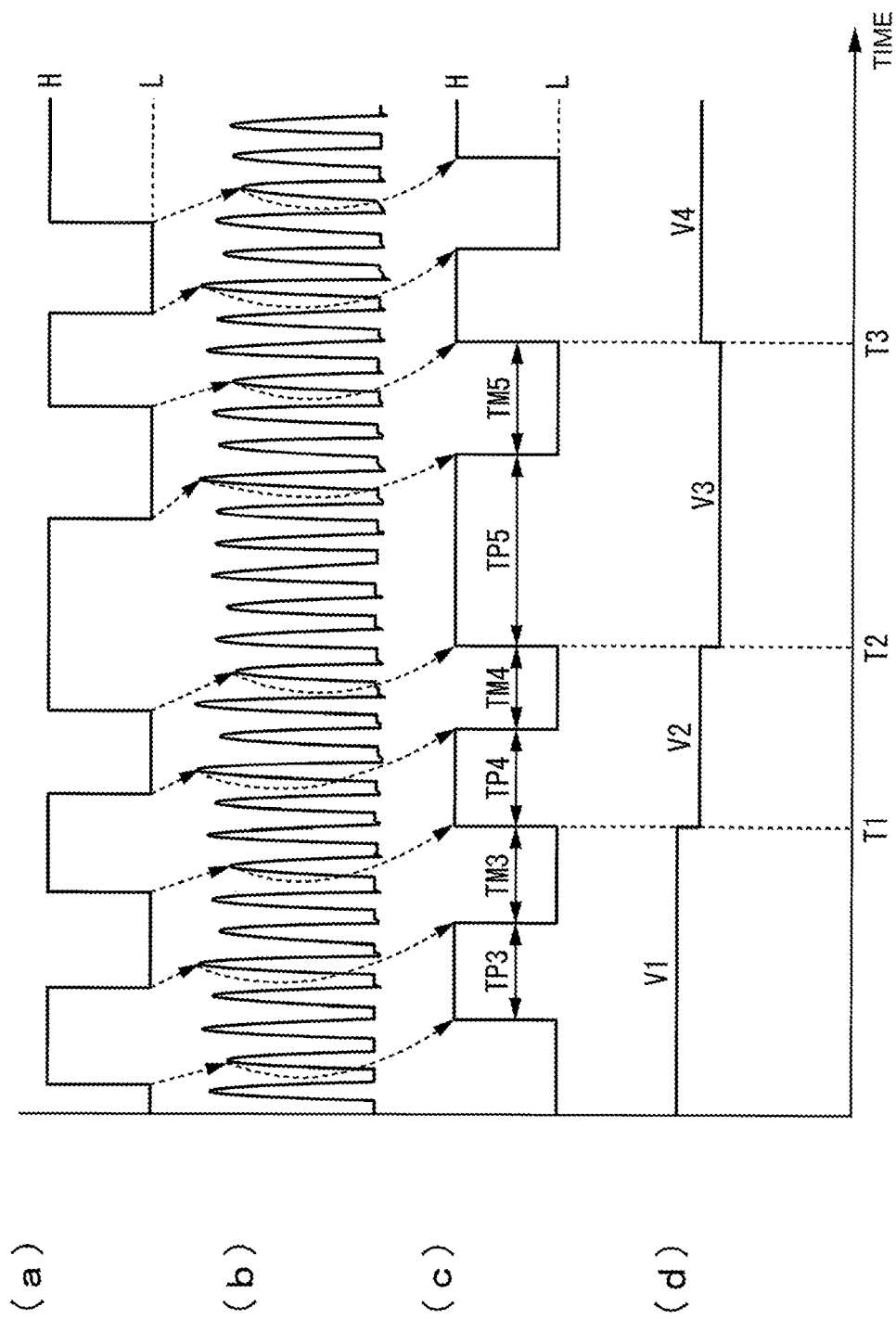
FIG. 5 is a diagram for illustrating an example of voltage control processing of the power feeding device according to the first embodiment.

FIG. 5 is a diagram for illustrating an example of the voltage control processing of the power feeding device 1 according to the first embodiment.

Waveforms illustrated in FIG. 5 represent, in the order from above, (a) a gate signal of the resonance control transistor 23 of the power receiving device 2, (b) a voltage of the feeding coil 11 of the power feeding device 1, (c) results obtained by estimating the resonant period and the non-resonant period, and (d) the VCC voltage (drive voltage) of the power feeding device 1. The vertical axes of the waveforms represent a logic level in (a) of FIG. 5 and (c) of FIG. 5 and voltage in (b) of FIG. 5 and (d) of FIG. 5, and the horizontal axes thereof represent time.

When the logic level of the gate signal of the resonance control transistor 23 is changed by the resonance control unit 30 of the power receiving device 2 in (a) of FIG. 5, the peak voltage of the voltage (voltage of the node N1) of the feeding coil 11 varies as illustrated in (b) of FIG. 5, and this variation is detected by the crest value variation detection unit 16. Then, the voltage control section 171 of the power feeding control unit 17 estimates the resonant period and the non-resonant period based on the variation in peak voltage detected by the crest value variation detection unit 16 as illustrated in (c) of FIG. 5. The voltage control section 171 determines, for example, a point at which the peak voltage changes from a high level to a low level as the start of the resonant period, and determines, for example, a point at which the peak voltage changes from a low level to a high level as the start of the non-resonant period.

Here, a period of an H state of the waveform illustrated in (c) of FIG. 5 corresponds to the resonant period of the power receiving device 2, and a period of an L state thereof corresponds to the non-resonant period of the power receiving device 2. For example, when the VCC voltage is a voltage V1, the voltage control section 171 estimates, at a time T1, a resonant period TP3 and a non-resonant period TM3 based on the variation in peak voltage detected by the crest value variation detection unit 16. In this case, the voltage control section 171 performs control of decreasing the VCC voltage to a voltage V2 because the resonance ratio based on the resonant period TP3 and the non-resonant period TM3 is smaller than the predetermined value (predetermined ratio). That is, the voltage control section 171 outputs a control signal for decreasing the VCC voltage to the voltage V2 to the drive voltage generation unit 14.

Further, at a time T2, the voltage control section 171 estimates a resonant period TP4 and a non-resonant period TM4 based on the variation in peak voltage detected by the crest value variation detection unit 16. In this case, the voltage control section 171 performs control of decreasing the VCC voltage to a voltage V3 because the resonance ratio based on the resonant period TP4 and the non-resonant period TM4 is smaller than the predetermined value (predetermined ratio). That is, the voltage control section 171 outputs a control signal for decreasing the VCC voltage to the voltage V3 to the drive voltage generation unit 14.

Further, at a time T3, the voltage control section 171 estimates a resonant period TP5 and a non-resonant period TM5 based on the variation in peak voltage detected by the crest value variation detection unit 16. In this case, the voltage control section 171 performs control of increasing the VCC voltage to a voltage V4 because the resonance ratio based on the resonant period TP5 and the non-resonant period TM5 is larger than the predetermined value (predetermined ratio). That is, the voltage control section 171 outputs a control signal for increasing the VCC voltage to the voltage V4 to the drive voltage generation unit 14.

Next, drive control processing of the power feeding device 1 according to the first embodiment is described with reference to FIG. 6.

Figure 6:
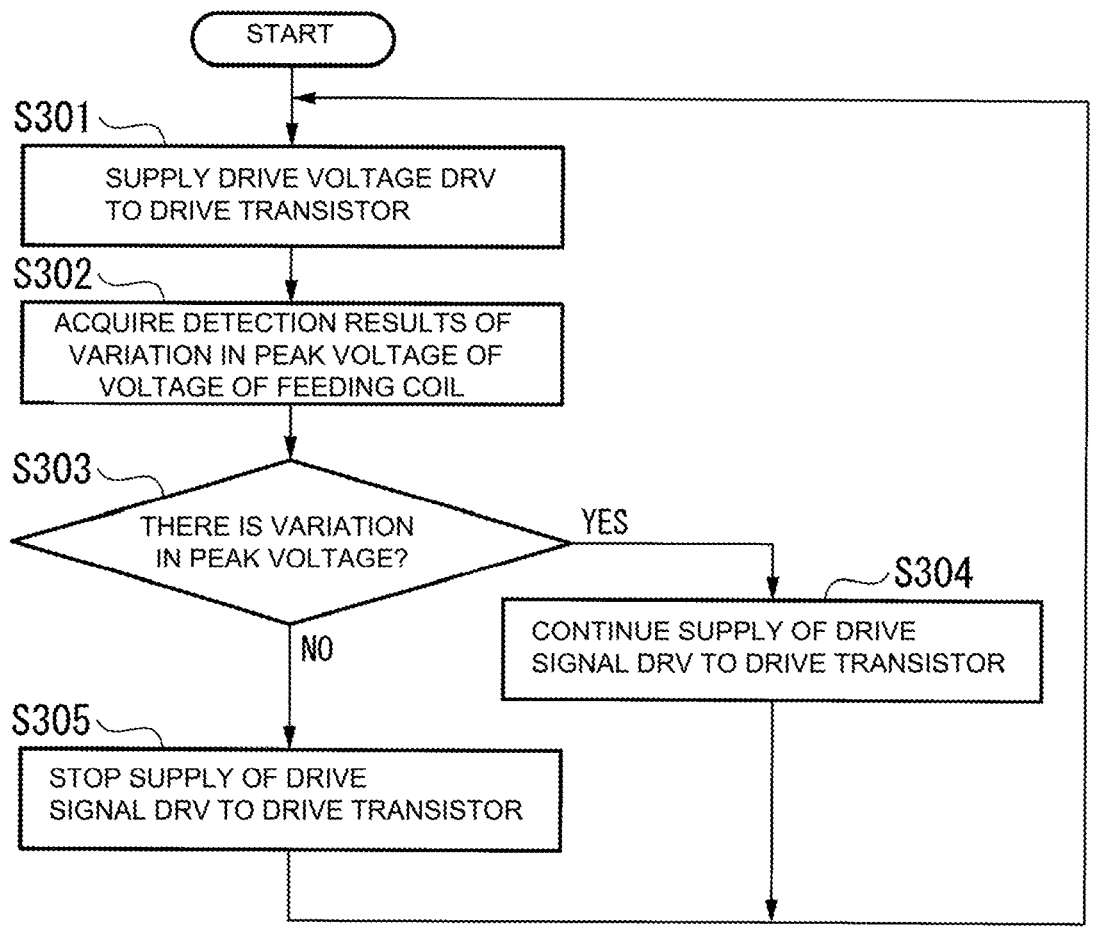
FIG. 6 is a flowchart for illustrating an example of drive control processing of the power feeding device according to the first embodiment.

FIG. 6 is a flowchart for illustrating an example of the drive control processing of the power feeding device 1 according to the first embodiment.

In FIG. 6, first, the power feeding control unit 17 of the power feeding device 1 performs control so that the drive signal DRV is supplied to the drive transistor 13 (Step S301). Specifically, the drive control section 172 of the power feeding control unit 17 causes the drive signal generation unit 15 to supply the drive signal DRV to the gate terminal of the drive transistor 13.

Next, the drive control section 172 acquires the detection results of the variation in peak voltage of the voltage of the feeding coil 11 (Step S302). That is, the crest value variation detection unit 16 detects the variation in peak voltage, and the drive control section 172 acquires the detection results of the variation in peak voltage detected by the crest value variation detection unit 16.

Next, the drive control section 172 determines whether or not there is the variation in peak voltage (Step S303). When there is the variation in peak voltage (Step S303: YES), the drive control section 172 continues the supply of the drive signal DRV to the drive transistor 13 (Step S304). That is, the drive control section 172 causes the drive signal generation unit 15 to continue outputting the drive signal DRV. After the processing in Step S304, the drive control section 172 returns the flow to Step S301 after an elapse of a power feeding period. With this, the power feeding device 1 continuously drives the feeding coil 11.

Meanwhile, when there is no variation in peak voltage (Step S303: NO), the drive control section 172 stops the supply of the drive signal DRV to the drive transistor 13 (Step S305). That is, the drive control section 172 causes the drive signal generation unit 15 to stop outputting the drive signal DRV. After the processing in Step S305, the drive control section 172 returns the flow to Step S301 after an elapse of the power feeding period. With this, the power feeding device 1 intermittently drives the feeding coil 11.

As described above, the power feeding system 100 according to the first embodiment includes the power feeding device 1 having the feeding coil 11, and the power receiving device 2 having the receiving coil 21, and is configured to supply electric power from the power feeding device 1 to the power receiving device 2 through electromagnetic induction. The power receiving device 2 includes the resonant circuit 20 and the resonance control unit 30. The resonant circuit 20 includes the receiving coil 21 configured to receive electric power from the feeding coil 11, the resonant capacitor 22 configured to resonate with the receiving coil 21, and the resonance control transistor 23 (first switching element) configured to perform switching between the resonant state and the non-resonant state by changing an electrical connection state of the resonant capacitor 22. The resonance control unit 30 is configured to control the resonance control transistor 23 based on the received power, which is received by the receiving coil 21 from the feeding coil 11, and the power consumption of the load 26 to which the received power is supplied. Further, the power feeding device 1 includes the drive transistor 13 (second switching element), the crest value variation detection unit 16 (variation detection unit), and the power feeding control unit 17. The drive transistor 13 is connected in series to the feeding coil 11. The drive signal generation unit 15 is configured to generate the drive signal DRV for driving the feeding coil 11 by switching the drive transistor 13 between the conductive state and the non-conductive state. The crest value variation detection unit 16 is configured to detect the change in electrical connection state of the resonant capacitor 22 as the periodic waveform variation in excited voltage excited in the feeding coil 11. The power feeding control unit 17 is configured to control electric power supplied to the feeding coil 11 based on the period of the resonant state and the period of the non-resonant state of the power receiving device 2 that are estimated from the periodic waveform variation detected by the crest value variation detection unit 16.

With this, the power feeding system 100 according to the first embodiment estimates the period of the resonant state and the period of the non-resonant state of the power receiving device 2 based on the periodic waveform variation in the voltage of the feeding coil 11 detected on the power feeding device 1 side, and controls electric power supplied to the feeding coil 11 based on the period of the resonant state and the period of the non-resonant state. The period of the resonant state and the period of the non-resonant state of the power receiving device 2 change depending on the state of the load 26 on the power receiving device 2 side and the coupling state between the feeding coil 11 and the receiving coil 21. The power feeding device 1 is therefore not required to include a communication unit in order to grasp the state of the load 26 and the coupling state between the feeding coil 11 and the receiving coil 21. This means that the power feeding system 100 according to the first embodiment can supply the power receiving device 2 with appropriate electric power (for example, an appropriate drive voltage) depending on the state of the load 26 and the coupling state between the feeding coil 11 and the receiving coil 21, for example, without addition of the communication unit. Thus, the power feeding system 100 according to the first embodiment can improve the power feeding efficiency without addition of the communication unit.

Further, the power feeding system 100 according to the first embodiment can improve the power feeding efficiency, and hence can reduce the power consumption through power feeding (achieve low power consumption).

Further, in the first embodiment, the power feeding control unit 17 (voltage control section 171) is configured to change the voltage supplied to the feeding coil 11 so that the ratio (for example, the resonance ratio) between the period of the resonant state and the period of the non-resonant state reaches the predetermined ratio.

With this, the power feeding system 100 according to the first embodiment can improve the power feeding efficiency without addition of the communication unit by a simple procedure of controlling the voltage supplied to the feeding coil 11 based on the ratio between the period of the resonant state and the period of the non-resonant state.

Further, in the first embodiment, the power feeding control unit 17 (voltage control section 171) is configured to increase the voltage supplied to the feeding coil 11 when the resonance ratio calculated by the above-mentioned expression (1) is larger than the predetermined value (predetermined ratio). The power feeding control unit 17 (voltage control section 171) is configured to decrease the voltage supplied to the feeding coil 11 when the resonance ratio is smaller than the predetermined value (predetermined ratio).

With this, the power feeding system 100 according to the first embodiment can appropriately control the voltage supplied to the feeding coil 11 depending on the state of the load 26 and the coupling state between the feeding coil 11 and the receiving coil 21, for example.

Further, in the first embodiment, the power feeding control unit 17 (voltage control section 171) may be configured to calculate a moving average over a plurality of cycles of the ratio between the period of the resonant state and the period of the non-resonant state, and control electric power supplied to the feeding coil 11 based on the moving average. For example, when a moving average over three cycles is applied at the time T3 of FIG. 5, the power feeding control unit 17 may calculate the resonance ratio through use of the following expression (2).

$$\text{Resonance ratio} = (TP3 + TP4 + TP5)/(TM3 + TM4 + TM5) \qquad (2)$$

With this, the power feeding system 100 according to the first embodiment can reduce the influence of disturbance, for example, noise when electric power supplied to the feeding coil 11 is controlled. Thus, the power feeding system 100 according to the first embodiment can more appropriately control electric power supplied to the feeding coil 11 depending on the state of the load 26 and the coupling state between the feeding coil 11 and the receiving coil 21.

Further, in the first embodiment, the resonance control unit 30 is configured to control the resonance control transistor 23 so that the resonant circuit 20 is put into the resonant state when the voltage of the supply line (voltage of the node N4) through which the received power after rectification is supplied to the load 26 is equal to or less than the predetermined threshold value. Meanwhile, the resonance control unit 30 is configured to control the resonance control transistor 23 so that the resonant circuit 20 is put into the non-resonant state when the voltage of the supply line (voltage of the node N4) is larger than the predetermined threshold value.

With this, in the power feeding system 100 according to the first embodiment, the power receiving device 2 can appropriately perform switching between the resonant state and the non-resonant state by a simple procedure.

Further, in the first embodiment, the power feeding control unit 17 includes the drive control section 172 configured to determine whether or not electric power can be supplied to the power receiving device 2 based on the periodic waveform variation detected by the crest value variation detection unit 16, and control whether or not to continue the supply of the drive signal to the drive transistor 13 based on a result of the determination.

With this, the power feeding system 100 according to the first embodiment can accurately determine whether or not electric power can be supplied to the power receiving device 2. Further, the power feeding system 100 according to the first embodiment can stop the supply of the drive signal to the drive transistor 13, for example, when electric power cannot be supplied to the power receiving device 2, and hence the power feeding system 100 can reduce wasteful consumption of electric power for feeding.

Further, the power feeding device 1 according to the first embodiment is configured to supply electric power to the power receiving device 2 through electromagnetic induction. The power receiving device 2 includes the resonant circuit 20 having the receiving coil 21 configured to receive electric power from the feeding coil 11, the resonant capacitor 22 configured to resonate with the receiving coil 21, and the resonance control transistor 23 configured to perform switching between the resonant state and the non-resonant state by changing an electrical connection state of the resonant capacitor 22, and the resonance control unit 30 configured to control the resonance control transistor 23 based on the received power, which is received by the receiving coil 21 from the feeding coil 11, and the power consumption of the load 26 to which the received power is supplied. The power feeding device 1 includes the drive transistor 13 connected in series to the feeding coil 11, the drive signal generation unit 15, the crest value variation detection unit 16, and the power feeding control unit 17. The drive signal generation unit 15 is configured to generate the drive signal DRV for driving the feeding coil 11 by switching the drive transistor 13 between the conductive state and the non-conductive state. The crest value variation detection unit 16 is configured to detect the change in electrical connection state of the resonant capacitor 22 as the periodic waveform variation in the excited voltage excited in the feeding coil 11. The power feeding control unit 17 is configured to control electric power supplied to the feeding coil 11 based on the period of the resonant state and the period of the non-resonant state that are estimated from the periodic waveform variation detected by the crest value variation detection unit 16.

With this, the power feeding device 1 according to the first embodiment exhibits the same effects as those of the power feeding system 100 described above, and can improve the power feeding efficiency without addition of the communication unit.

Further, a power feeding method according to the first embodiment is a power feeding method for the power feeding system 100 having the power feeding device 1 and the power receiving device 2, and is configured to supply electric power from the power feeding device 1 to the power receiving device 2 through electromagnetic induction. The power receiving device 2 includes the resonant circuit 20 having the receiving coil 21 configured to receive electric power from the feeding coil 11, the resonant capacitor 22 configured to resonate with the receiving coil 21, and the resonance control transistor 23 configured to perform switching between the resonant state and the non-resonant state by changing an electrical connection state of the resonant capacitor 22. The power feeding device 1 includes the feeding coil 11. The power feeding method includes a drive signal generation step, a resonance control step, a variation detection step, and a power feeding control step. In the drive signal generation step, the power feeding device 1 generates the drive signal for driving the feeding coil 11 by switching the drive transistor 13, which is connected in series to the feeding coil 11, between the conductive state and the non-conductive state. In the resonance control step, the power receiving device 2 controls the resonance control transistor 23 based on the received power, which is received by the receiving coil 21 from the feeding coil 11, and the power consumption of the load 26 to which the received power is supplied. In the variation detection step, the power feeding device 1 detects the change in electrical connection state of the resonant capacitor 22 as the periodic waveform variation in the excited voltage excited in the feeding coil 11. In the power feeding control step, the power feeding device 1 controls electric power supplied to the feeding coil 11 based on the period of the resonant state and the period of the non-resonant state that are estimated from the periodic waveform variation detected in the variation detection step.

With this, the power feeding method according to the first embodiment exhibits the same effects as those of the power feeding system 100 described above, and can improve the power feeding efficiency without addition of the communication unit.

Second Embodiment

Next, a power feeding system 100a according to a second embodiment of the present invention is described with reference to the drawings.

Figure 7:
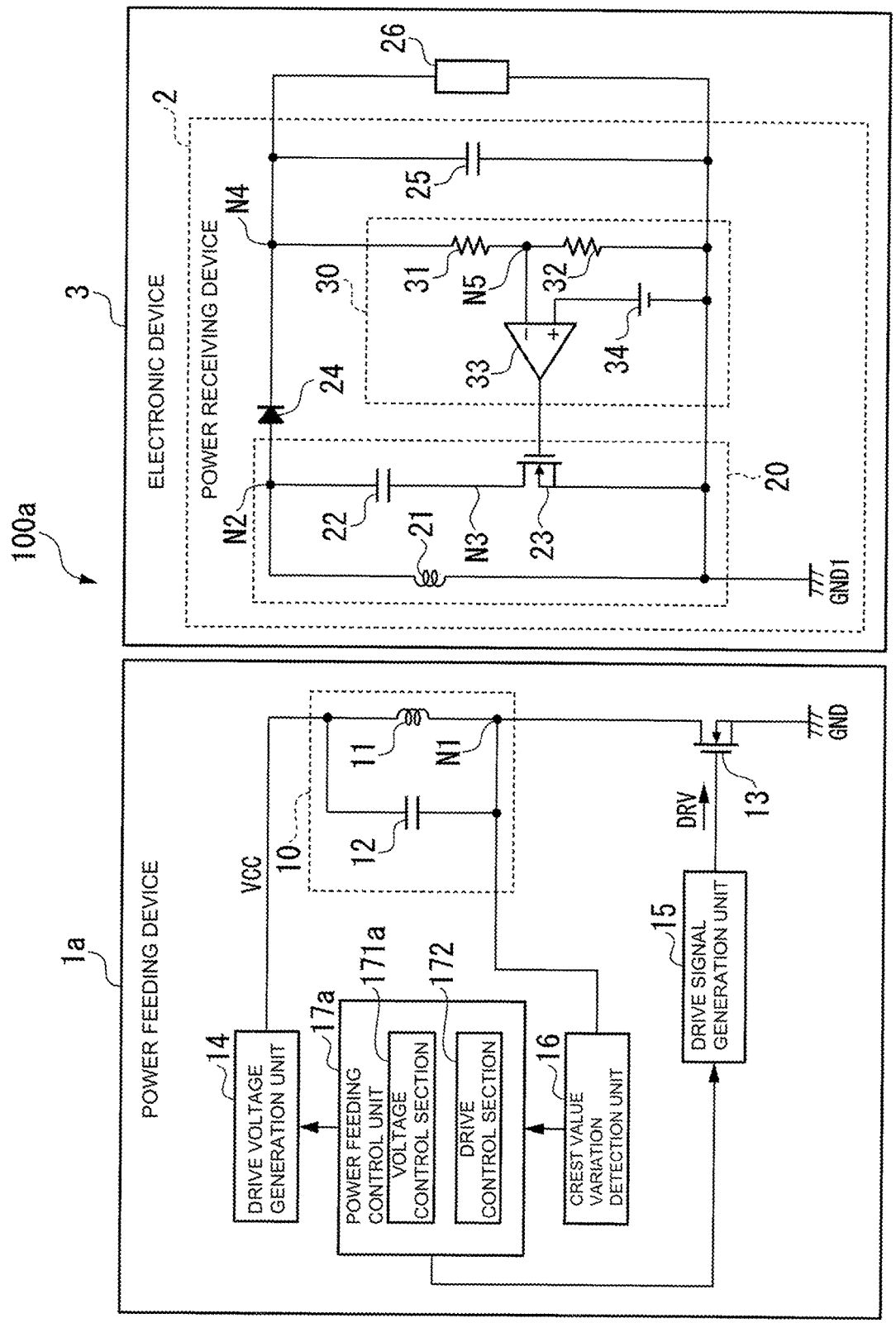
FIG. 7 is a functional block diagram for illustrating an example of a power feeding system according to a second embodiment of the present invention.

FIG. 7 is a functional block diagram for illustrating an example of the power feeding system 100a according to the second embodiment.

As illustrated in FIG. 7, the power feeding system 100a includes a power feeding device 1a and an electronic device 3 having a power receiving device 2.

In FIG. 7, the same configuration as that of FIG. 1 is denoted by the same reference symbol, and the description thereof is omitted.

In the second embodiment, description is given of an example of controlling electric power supplied to a feeding coil 11 based on a repetition cycle of a period of a resonant state and a period of a non-resonant state of a resonant circuit 20 instead of the ratio between the period of the resonant state and the period of the non-resonant state.

The power feeding device 1a includes the feeding coil 11, a resonant capacitor 12, a drive transistor 13, a drive voltage generation unit 14, a drive signal generation unit 15, a crest value variation detection unit 16, and a power feeding control unit 17a.

The power feeding control unit 17a is configured to control whether the drive transistor 13 is intermittently driven or continuously driven with a drive signal DRV generated by the drive signal generation unit 15, based on the results of the variation in peak voltage detected by the crest value variation detection unit 16, and change the VCC voltage generated by the drive voltage generation unit 14 based on the period of the resonant state and the period of the non-resonant state that are estimated from the results of the variation in peak voltage. The power feeding control unit 17a includes a voltage control section 171a and a drive control section 172.

The voltage control section 171a is configured to control electric power supplied to the feeding coil 11 based on the period of the resonant state and the period of the non-resonant state of the power receiving device 2 that are estimated from the periodic waveform variation detected by the crest value variation detection unit 16. The power feeding control unit 17a is configured to change a voltage supplied to the feeding coil 11, for example, so that a repetition cycle of the period of the resonant state and the period of the non-resonant state reaches a predetermined cycle. The voltage control section 171a is configured to estimate the period of the resonant state and the period of the non-resonant state of the power receiving device 2, for example, based on the results of the variation in peak voltage detected by the crest value variation detection unit 16, and calculate a repetition cycle by adding the period of the resonant state and the period of the non-resonant state together. The voltage control section 171a is configured to calculate a repetition cycle by the following expression (3), for example.

Repetition cycle=(Period of resonant state+period of non-resonant state) (3)

The voltage control section 171a is configured to control the drive voltage (VCC voltage) output from the drive voltage generation unit 14 so that the calculated repetition cycle reaches the predetermined value (predetermined cycle).

Specifically, the voltage control section 171a is configured to perform control of raising (increasing) the drive voltage output from the drive voltage generation unit 14 when the calculated repetition cycle is larger than the predetermined value. Meanwhile, the voltage control section 171a is configured to perform control of lowering (decreasing) the drive voltage output from the drive voltage generation unit 14 when the calculated repetition cycle is smaller than the predetermined value.

In this case, the predetermined value (predetermined cycle) is determined to be a cycle, at which the power feeding efficiency is satisfactory, based on the power consumption of the load 26 and supply power from the power feeding device 1a to the power receiving device 2. The power feeding efficiency is influenced by the power consumption of the load 26, the repetition cycle of the period of the resonant state and the period of the non-resonant state, and the like. The power feeding efficiency is improved as the resonant state is prolonged and the repetition cycle is prolonged, for example. The predetermined value (predetermined cycle) is therefore set so that the repetition cycle becomes equal to or more than the predetermined value (predetermined cycle).

Next, the operation of the power feeding system 100a according to the second embodiment is described with reference to the drawings.

Resonance control processing of the power receiving device 2 according to the second embodiment is the same as that illustrated in FIG. 2 described above, and hence the description thereof is omitted here. Further, drive control processing of the power feeding device 1a according to the second embodiment is the same as that illustrated in FIG. 6 described above, and hence the description thereof is omitted here.

Voltage control processing of the power feeding device 1a according to the second embodiment is described with reference to FIG. 8.

Figure 8:
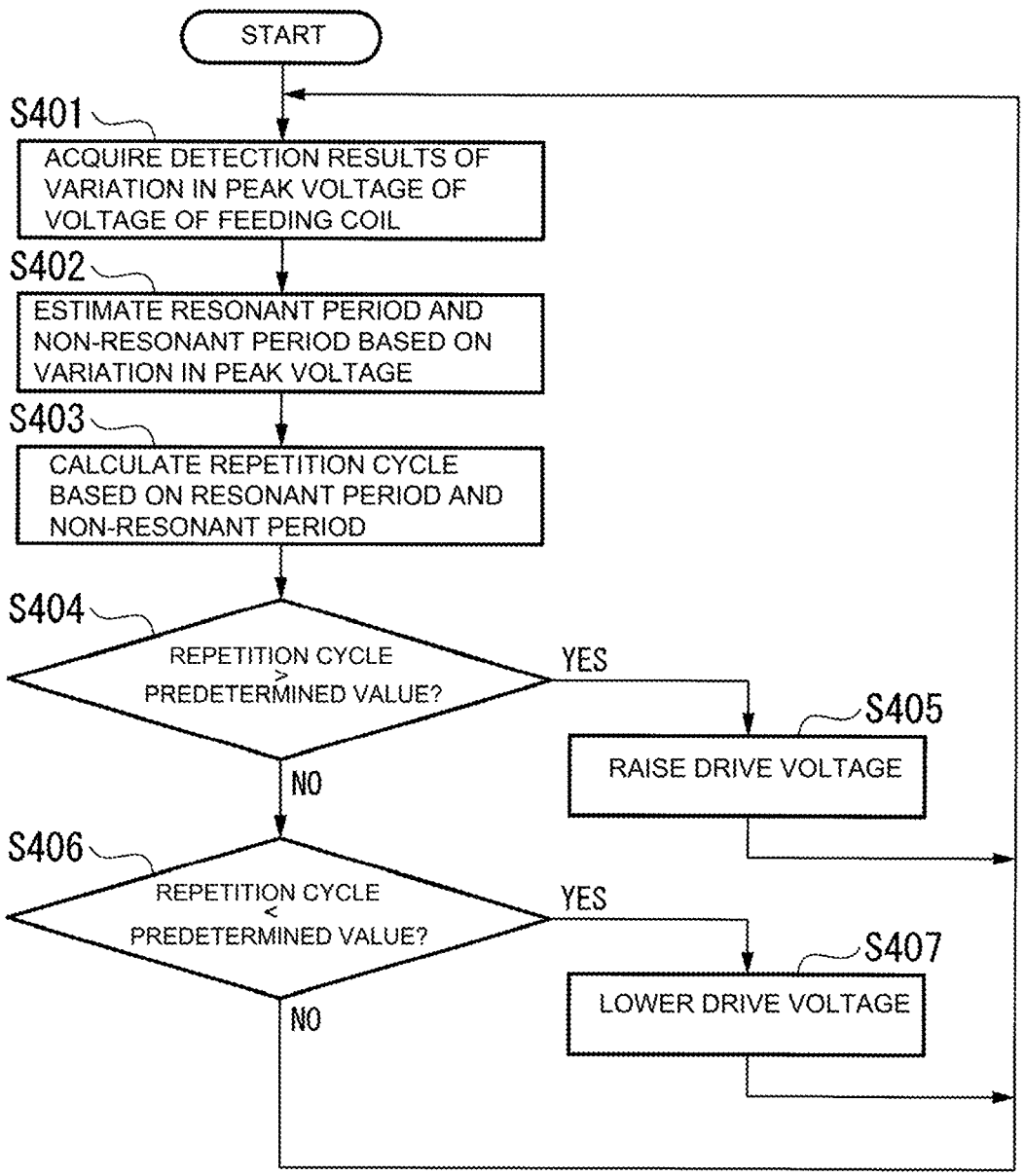
FIG. 8 is a flowchart for illustrating an example of voltage control processing of a power feeding device according to the second embodiment.

FIG. 8 is a flowchart for illustrating an example of the voltage control processing of the power feeding device 1a according to the second embodiment.

In FIG. 8, the processing in Step S401 and Step S402 is the same as that in Step S201 and Step S202 illustrated in FIG. 4 described above, and hence the description thereof is omitted here.

In Step S403, the voltage control section 171a of the power feeding control unit 17a calculates the repetition cycle based on the resonant period and the non-resonant period. The voltage control section 171a calculates the repetition cycle through use of the above-mentioned expression (3), for example. The voltage control section 171a may calculate the repetition cycle based on a moving average over a plurality of cycles (for example, three cycles) of the resonant period and the non-resonant period.

Next, the voltage control section 171a determines whether or not the calculated repetition cycle is larger than the predetermined value (predetermined cycle) (Step S404). The case in which the repetition cycle is larger than the predetermined value (predetermined cycle) corresponds to (b) of FIG. 3 described above, in which the received power is insufficient with respect to the power consumption of the load 26. When the repetition cycle is larger than the predetermined value (predetermined cycle) (Step S404: YES), the voltage control section 171a advances the flow to Step S405. Meanwhile, when the repetition cycle is not larger than the predetermined value (predetermined cycle) (Step S404: NO), the voltage control section 171a advances the flow to Step S406.

In Step S405, the voltage control section 171a performs control of raising the drive voltage. That is, the voltage control section 171a outputs a control signal for increasing the VCC voltage to the drive voltage generation unit 14. The voltage control section 171a may, for example, increase the VCC voltage by the certain voltage ΔV or change a voltage increase value based on a difference between the repetition cycle and the predetermined value (predetermined cycle). After the processing in Step S405, the voltage control section 171a returns the flow to Step S401.

Further, in Step S406, the voltage control section 171a determines whether or not the calculated repetition cycle is smaller than the predetermined value (predetermined cycle). The case in which the repetition cycle is smaller than the predetermined value (predetermined cycle) corresponds to (c) of FIG. 3 described above, in which the received power is excessive with respect to the power consumption of the load 26. When the repetition cycle is smaller than the predetermined value (predetermined cycle) (Step S406: YES), the voltage control section 171a advances the flow to Step S407. Meanwhile, when the repetition cycle is not smaller than the predetermined value (predetermined cycle) (Step S406: NO), the voltage control section 171a returns the flow to Step S401.

In Step S407, the voltage control section 171a performs control of lowering the drive voltage. That is, the voltage control section 171a outputs a control signal for decreasing the VCC voltage to the drive voltage generation unit 14. The voltage control section 171a may, for example, decrease the VCC voltage by the certain voltage ΔV or change a voltage decrease value based on a difference between the repetition cycle and the predetermined value (predetermined cycle). After the processing in Step S407, the voltage control section 171a returns the flow to Step S401.

As described above, the power feeding system 100a according to the second embodiment includes the power feeding device 1a and the power receiving device 2. The power feeding device 1a includes the drive transistor 13, the crest value variation detection unit 16, and the power feeding control unit 17a as described above. The power feeding control unit 17a is configured to change the voltage supplied to the feeding coil 11 so that the repetition cycle of the period of the resonant state and the period of the non-resonant state reaches the predetermined cycle.

With this, the power feeding system 100a according to the second embodiment exhibits the same effects as those of the first embodiment described above, and can improve the power feeding efficiency without addition of a communication unit. Further, the power feeding system 100a according to the second embodiment can improve the power feeding efficiency without addition of the communication unit by a simple procedure of controlling the voltage supplied to the feeding coil 11 based on the repetition cycle of the period of the resonant state and the period of the non-resonant state.

Note that, the present invention is not limited to each of the above-mentioned embodiments, and may be changed within the scope not departing from the gist of the present invention.

For example, in each of the above-mentioned embodiments, the following case is described as an example in which the resonance control unit 30 of the power receiving device 2 is configured to control the resonance control transistor 23 based on the received power and the power consumption of the load 26. Specifically, the resonance control unit 30 of the power receiving device 2 is configured to control the resonance control transistor 23 based on the voltage (receiving voltage) of the node N4 through which the received power after rectification is supplied to the load 26. However, the present invention is not limited thereto. For example, the resonance control unit 30 may be configured to control the resonance control transistor 23 based on a current flowing through the load 26 instead of the voltage (receiving voltage) of the node N4, or other procedures may be used.

Further, in each of the above-mentioned embodiments, description is given of the example in which the resonance control unit 30 is configured to switch the resonance control transistor 23 between the ON state (resonant state) and the OFF state (non-resonant state) based on one threshold voltage (predetermined voltage). However, the present invention is not limited thereto. For example, the resonance control unit 30 may be configured to perform control with hysteresis based on a threshold voltage (first threshold value) for turning on the resonance control transistor 23 and a threshold voltage (second threshold value) for turning off the resonance control transistor 23.

Further, in each of the above-mentioned embodiments, as an example of the variation detection unit configured to detect the periodic waveform variation of the excited voltage of the feeding coil 11, description is given of the example using the crest value variation detection unit 16 configured to detect the peak voltage of the feeding coil 11. However, the present invention is not limited thereto. For example, the variation detection unit may be configured to detect the periodic waveform variation of the excited voltage of the feeding coil 11 as a variation in waveform frequency of the excited voltage or a variation in waveform cycle of the excited voltage.

Further, in each of the above-mentioned embodiments, as an example in which the voltage control section 171 (171a) is configured to control electric power supplied to the feeding coil 11, description is given of the example in which the voltage control section 171 (171a) is configured to control the voltage supplied to the feeding coil 11. However, the voltage control section 171 (171a) may be configured to control a current supplied to the feeding coil 11.

Further, in each of the above-mentioned embodiments, the predetermined value (predetermined ratio or predetermined cycle) being the target value may be varied depending on the load 26.

Further, in the first embodiment described above, description is given of the example in which the voltage control section 171 uses the resonance ratio being the proportion of the period of the resonant state with respect to the period of the non-resonant state as an example of the ratio between the period of the resonant state and the period of the non-resonant state. However, the present invention is not limited thereto. The voltage control section 171 may use, for example, the non-resonance ratio being the proportion of the period of the non-resonant state with respect to the period of the resonant state, or the proportion of the period of the resonant state with respect to the cycle of the period of the resonant state and the period of the non-resonant state.

Further, in the second embodiment described above, description is given of the example in which the voltage control section 171a is configured to calculate the repetition cycle based on the period of the resonant state and the period of the non-resonant state. However, the voltage control section 171a may be configured to calculate the repetition cycle based on any one of a start point of the resonant state, an end point of the resonant state, a start point of the non-resonant state, and an end point of the non-resonant state. In this case, the voltage control section 171a is not required to estimate the period of the resonant state and the period of the non-resonant state.

Further, in the first embodiment described above, description is given of the example in which the voltage control section 171 is configured to calculate the ratio between the period of the resonant state and the period of the non-resonant state through use of the moving average. However, the voltage control section 171 may be configured to control the drive voltage supplied to the feeding coil 11 for each cycle without using the moving average. Further, the voltage control section 171 may be configured to control the drive voltage through use of the moving average for each cycle, or may be configured to control the drive voltage through use of the moving average for a plurality of cycles.

Further, in the second embodiment described above, the voltage control section 171a may be configured to calculate the repetition cycle through use of the moving average.

Each configuration included in the power feeding system 100 (100a) may be implemented by dedicated hardware. Each configuration included in the power feeding system 100 (100a) may be constructed by a memory and a CPU, and its functions may be implemented by loading a program for implementing each configuration included in the power feeding system 100 (100a) onto the memory and executing the program.

What is claimed is:

1. A power feeding system, comprising:
a power feeding device having a feeding coil; and
a power receiving device having a receiving coil,
the power feeding system being configured to supply electric power from the power feeding device to the power receiving device through electromagnetic induction,
the power receiving device comprising:
a resonant circuit having:
the receiving coil configured to receive the electric power from the feeding coil;

a resonant capacitor configured to resonate with the
receiving coil; and
a first switching element configured to perform
switching between a resonant state and a non-
resonant state by changing an electrical connection state of the resonant capacitor; and
a resonance control unit configured to control the
first switching element based on received power
by the receiving coil from the feeding coil, and
power consumption of a load to which the
received power is supplied,
the power feeding device comprising:
a second switching element connected in series to the
feeding coil;
a drive signal generation unit configured to generate
a drive signal for driving the feeding coil by
switching the second switching element between a
conductive state and a non-conductive state;
a variation detection unit configured to detect the
change in electrical connection state of the resonant capacitor as a periodic waveform variation in
an excited voltage excited in the feeding coil;
a variable power supply configured to vary a voltage
value of a drive voltage supplied to the feeding
coil; and
a power feeding control unit configured to control
the voltage value of the drive voltage supplied to
the feeding coil based on a period of the resonant
state and a period of the non-resonant state that are
estimated from the periodic waveform variation
detected by the variation detection unit.

2. A power feeding system according to claim 1, wherein the power feeding control unit is configured to change the voltage value of the drive voltage supplied to the feeding coil so that a ratio between the period of the resonant state and the period of the non-resonant state reaches a predetermined ratio.

3. A power feeding system according to claim 1, wherein the power feeding control unit is configured to change the voltage value of the drive voltage supplied to the feeding coil so that a repetition cycle of the period of the resonant state and the period of the non-resonant state reaches a predetermined cycle.

4. A power feeding system according to claim 1, wherein the power feeding control unit is configured to calculate a moving average over a plurality of cycles of a ratio between the period of the resonant state and the period of the non-resonant state, and control the voltage value of the drive voltage supplied to the feeding coil based on the moving average.

5. A power feeding system according to claim 1, wherein the resonance control unit is configured to control the first switching element so that the resonant circuit is set to the resonant state when a voltage of a supply line through which the received power is supplied to the load is equal to or less than a predetermined threshold value, and control the first switching element so that the resonant circuit is set to the non-resonant state when the voltage of the supply line is larger than the predetermined threshold value.

6. A power feeding system according to claim 1, wherein the power feeding control unit comprises a drive control section configured to determine whether or not the electric power can be supplied to the power receiving device based on the periodic waveform variation detected by the variation detection unit, and control whether or not to continue supply of the drive signal to the second switching element based on a result of the determination.

7. A power feeding device configured to supply electric power to a power receiving device through electromagnetic induction,
the power receiving device comprising:
a resonant circuit having:
a receiving coil configured to receive the electric
power from a feeding coil;
a resonant capacitor configured to resonate with the
receiving coil; and
a first switching element configured to perform
switching between a resonant state and a non-
resonant state by changing an electrical connection state of the resonant capacitor; and
a resonance control unit configured to control the
first switching element based on received power
by the receiving coil from the feeding coil, and
power consumption of a load to which the
received power is supplied,
the power feeding device comprising:
a second switching element connected in series to the
feeding coil;
a drive signal generation unit configured to generate a
drive signal for driving the feeding coil by switching
the second switching element between a conductive
state and a non-conductive state;
a variation detection unit configured to detect the change
in electrical connection state of the resonant capacitor
as a periodic waveform variation in an excited voltage
excited in the feeding coil;
a variable power supply configured to vary a voltage
value of a drive voltage supplied to the feeding coil;
and
a power feeding control unit configured to control the
voltage value of the drive voltage supplied to the
feeding coil based on a period of the resonant state and
a period of the non-resonant state that are estimated
from the periodic waveform variation detected by the
variation detection unit.

8. A power feeding device configured to supply electric power, through electromagnetic induction, to a power receiving device having a receiving coil, a resonant capacitor configured to resonate with the receiving coil, and a first switching element configured to perform switching between a resonant state and a non-resonant state of the resonant capacitor,
the power feeding device comprising:
a feeding coil;
a second switching element connected in series to the
feeding coil;
a drive signal generation unit configured to generate a
drive signal for driving the feeding coil by switching
the second switching element between a conductive
state and a non-conductive state;
a variation detection unit configured to detect a change in
electrical connection state of the resonant capacitor as
a periodic waveform variation in an excited voltage
excited in the feeding coil;
a variable power supply configured to vary a voltage
value of a drive voltage supplied to the feeding coil;
and
a power feeding control unit configured to control the
voltage value of the drive voltage supplied to the
feeding coil based on a period of the resonant state and
a period of the non-resonant state that are estimated
from the periodic waveform variation detected by the
variation detection unit.

9. A power feeding method for a power feeding system configured to supply electric power from a power feeding device to a power receiving device through electromagnetic induction, the power receiving device comprising a resonant circuit having a receiving coil configured to receive electric power, a resonant capacitor configured to resonate with the receiving coil, and a first switching element configured to perform switching between a resonant state and a non-resonant state by changing an electrical connection state of the resonant capacitor, the power feeding device comprising a feeding coil, a second switching element connected in series to the feeding coil, and a variable power supply coupled to the feeding coil and configured to supply a drive voltage having a variable voltage value to the feeding coil, the power feeding method comprising:

generating a drive signal by the power feeding device for driving the feeding coil by switching the second switching element between a conductive state and a non-conductive state;

controlling the first switching element by the power receiving device based on received power by the receiving coil from the feeding coil, and power consumption of a load to which the received power is supplied;

detecting the change in electrical connection state of the resonant capacitor by the power feeding device as a periodic waveform variation in an excited voltage excited in the feeding coil; and controlling the variable voltage value of the drive voltage supplied to the feeding coil by the variable power supply based on a period of the resonant state and a period of the non-resonant state estimated from the periodic waveform variation.

* * * * *